(12) United States Patent
Zeng et al.

(10) Patent No.: US 10,833,371 B2
(45) Date of Patent: Nov. 10, 2020

(54) WOUND-TYPE CELL

(71) Applicant: NINGDE AMPEREX TECHNOLOGY LIMITED, Ningde (CN)

(72) Inventors: Qiao Zeng, Ningde (CN); Kefei Wang, Ningde (CN); Jiacai Cai, Ningde (CN); Yu Luo, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 16/113,952

(22) Filed: Aug. 27, 2018

(65) Prior Publication Data

US 2019/0013550 A1 Jan. 10, 2019

Related U.S. Application Data

(63) Continuation of application No. 15/457,778, filed on Mar. 13, 2017, now abandoned.

(30) Foreign Application Priority Data

Mar. 31, 2016 (CN) .......................... 2016 1 0195191

(51) Int. Cl.
*H01M 10/0587* (2010.01)
*H01M 10/04* (2006.01)
(Continued)

(52) U.S. Cl.
CPC ....... *H01M 10/0587* (2013.01); *H01M 2/263* (2013.01); *H01M 10/0409* (2013.01); *H01M 10/0431* (2013.01); *H01M 10/0525* (2013.01)

(58) Field of Classification Search
CPC ................................................ H01M 10/0409
See application file for complete search history.

(56) References Cited

U.S. PATENT DOCUMENTS

| 4,000,351 A * | 12/1976 | Hug ........................ H01M 6/10 429/94 |
| 2003/0099880 A1 * | 5/2003 | Park ........................ H01M 2/26 429/211 |

(Continued)

FOREIGN PATENT DOCUMENTS

CN       201397861 Y      2/2010

OTHER PUBLICATIONS

Zeng, Office Action, U.S. Appl. No. 15/457,778, dated Jun. 20, 2019, 12 pgs.

(Continued)

*Primary Examiner* — Robert S Carrico
(74) *Attorney, Agent, or Firm* — Morgan, Lewis & Bockius LLP

(57) ABSTRACT

A wound-type cell includes a first electrode plate; a second electrode plate; a separator, disposed between the first electrode plate and the second electrode plate; a first electrode tab electrically connected to the first electrode plate; and a second electrode tab electrically connected to the second electrode plate, in which the separator includes a third winding start end, the third winding start end is folded back to an inner side in a thickness direction and is disposed between the first electrode tab and the second electrode tab in a length direction.

18 Claims, 3 Drawing Sheets

(51) Int. Cl.
*H01M 2/26* (2006.01)
*H01M 10/0525* (2010.01)

(56) References Cited

U.S. PATENT DOCUMENTS

| | | | | |
|---|---|---|---|---|
| 2005/0277018 | A1* | 12/2005 | Kim | H01M 2/16 |
| | | | | 429/120 |
| 2010/0285342 | A1* | 11/2010 | Lee | H01M 2/34 |
| | | | | 429/94 |
| 2013/0045405 | A1* | 2/2013 | Ahn | H01M 10/0468 |
| | | | | 429/94 |
| 2013/0260203 | A1* | 10/2013 | Yoshida | H01M 2/22 |
| | | | | 429/94 |
| 2013/0316206 | A1* | 11/2013 | Jeong | H01M 10/052 |
| | | | | 429/94 |
| 2016/0268581 | A1* | 9/2016 | Ahn | H01M 2/263 |

OTHER PUBLICATIONS

Zeng, Final Office Action, U.S. Appl. No. 15/457,778, dated Dec. 19, 2019, 15 pgs.

* cited by examiner

WOUND-TYPE CELL

CROSS REFERENCE TO RELATED APPLICATIONS

The present application is a continuation application of U.S. application Ser. No. 15/457,778, entitled "WOUND-TYPE CELL AND WINDING MANDREL" filed on Mar. 13, 2017, which claims priority to Chinese patent application No. 201610195191.0, entitled "WOUND-TYPE CELL AND WINDING MANDREL" filed on Mar. 31, 2016, all of which are incorporated herein by reference in its entirety.

TECHNICAL FIELD

The present disclosure relates to the field of battery, and particularly relates to a wound-type cell.

BACKGROUND

With the commercial development of Lithium-ion cell, the requirement of market on energy density of the Lithium-ion cell is becoming higher and higher. Referring to FIG. 1, at a winding start end of a conventional wound-type cell, a blank positive current collector 111 (Al foil) is shorter than a blank negative current collector 211 (Cu foil) which is positioned at an inner side of the blank positive current collector 111, so the inside of the wound-type cell needs to redundantly wind a part of separator 3 which is positioned between the blank positive current collector 111 and the blank negative current collector 211 and is beyond the blank positive current collector 111 and the blank negative current collector 211, and this will not only lead to the waste of separator, but also increase a thickness of the wound-type cell and reduce the energy density of the wound-type cell.

SUMMARY

In view of the problem existing in the background, an object of the present disclosure is to provide a wound-type cell, including a first electrode plate; a second electrode plate; a separator, disposed between the first electrode plate and the second electrode plate; a first electrode tab electrically connected to the first electrode plate; and a second electrode tab electrically connected to the second electrode plate, in which the separator includes a third winding start end, the third winding start end is folded back to an inner side in a thickness direction and is disposed between the first electrode tab and the second electrode tab in a length direction.

Figure 1:
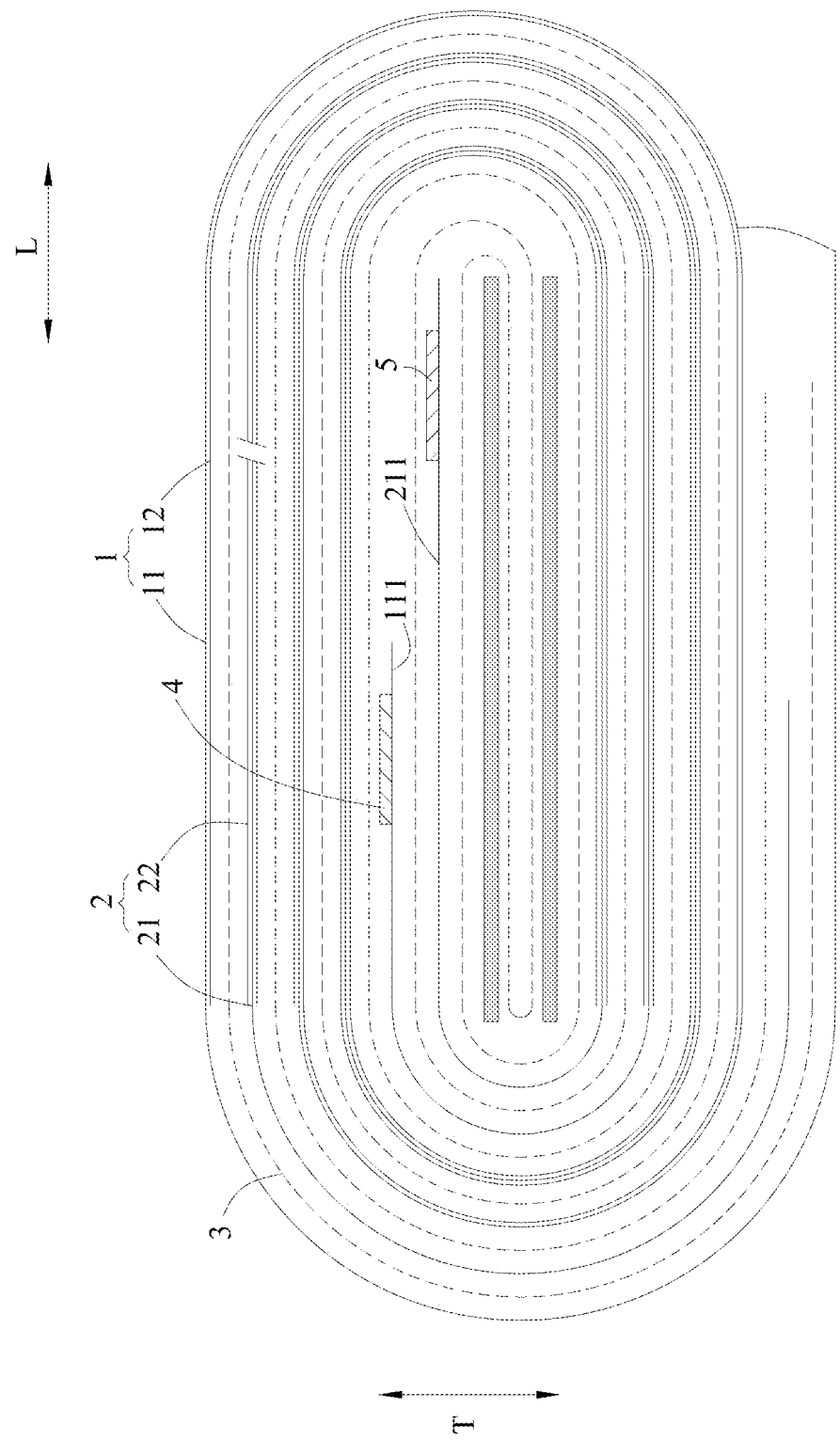
FIG. 1 is a schematic view of a wound-type cell and a winding mandrel of the prior art.

Reference numerals are represented as follows:
1 first electrode plate
 11 first current collector
 111 blank first current collector
  111E first end
 12 first active material layer
2 second electrode plate
 21 second current collector
  211 blank second current collector
   211E second end
 22 second active material layer
3 separator
4 first electrode tab
5 second electrode tab
E1 first winding start end
E2 second winding start end
E3 third winding start end
C arc-shaped portion
S1 first winding mandrel
 S11 first end surface
 S12 first side surface
S2 second winding mandrel
 S21 second end surface
 S22 second side surface
G clamping groove
L length direction
T thickness direction

DETAILED DESCRIPTION

Hereinafter a wound-type cell and a winding mandrel according to the present disclosure will be described in detail in combination with the figures.

Firstly, a wound-type cell according to a first aspect of the present disclosure will be described.

Figure 2:
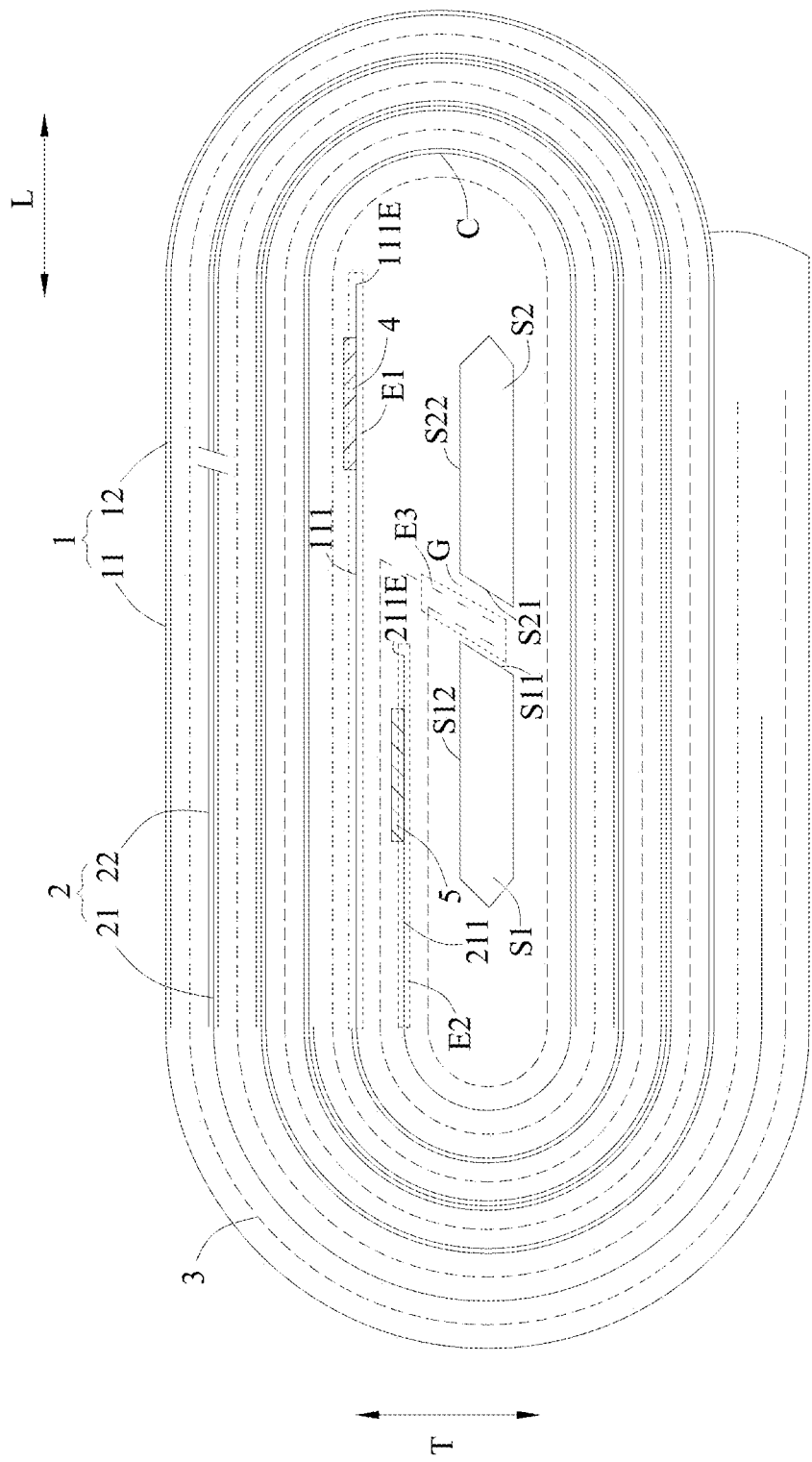
FIG. 2 is a schematic view of a wound-type cell and a winding mandrel according to the present disclosure, in which a first winding start end, a second winding start end and a third winding start end each are indicated by a dotted line frame.
Figure 3:
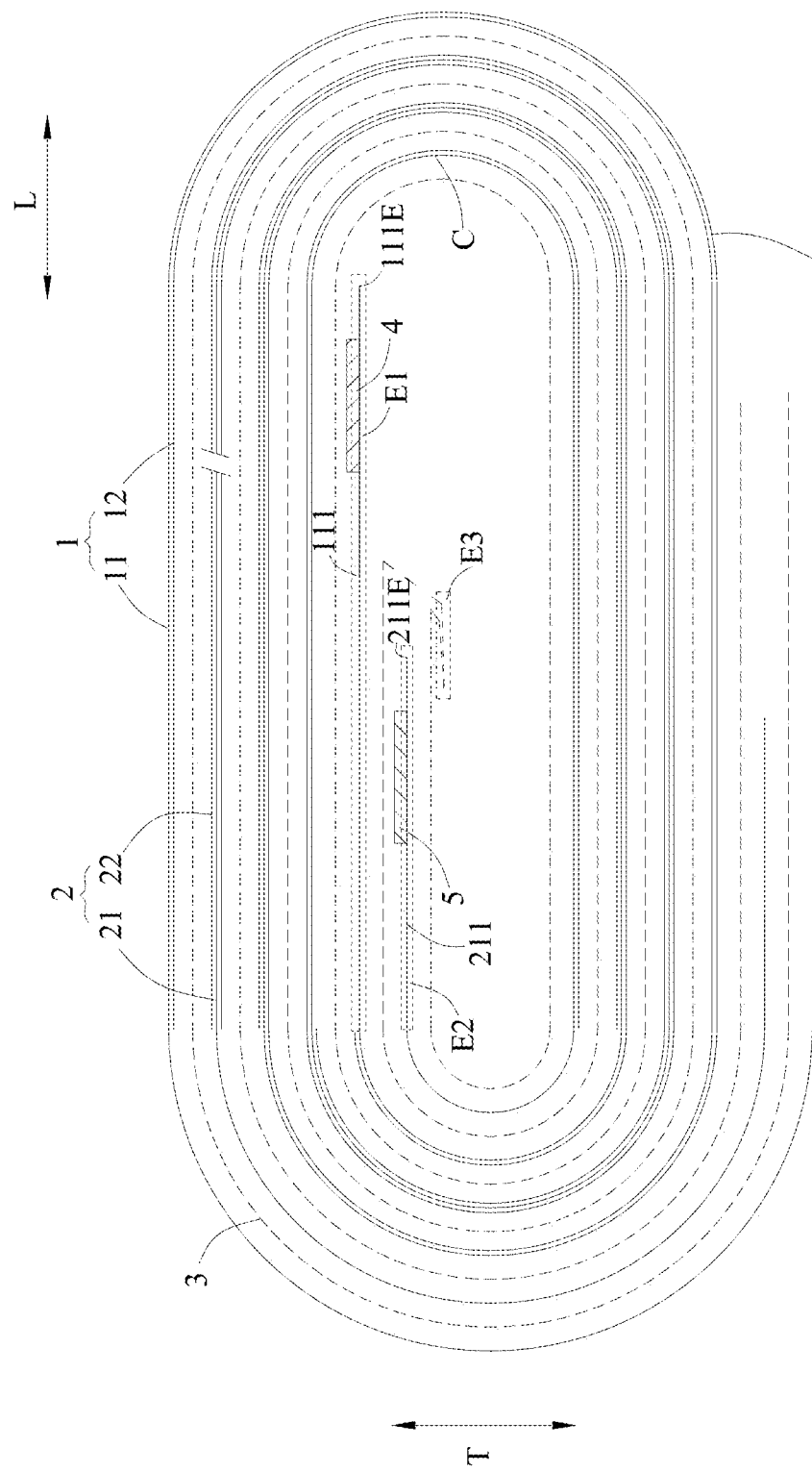
FIG. 3 is a schematic view of the wound-type cell according to the present disclosure, in which the first winding start end, the second winding start end and the third winding start end each are indicated by a dotted line frame.

Referring to FIG. 2 and FIG. 3, a wound-type cell according to the present disclosure comprises: a first electrode plate 1 having a first current collector 11 and a first active material layer 12 coated on a surface of the first current collector 11, and the first electrode plate 1 further has a blank first current collector 111 which is positioned at a first winding start end E1 and is not coated with the first active material layer 12; a second electrode plate 2 having a second current collector 21 and a second active material layer 22 coated on a surface of the second current collector 21, and the second electrode plate 2 further has a blank second current collector 211 which is positioned at a second winding start end E2 and is not coated with the second active material layer 22, and the blank second current collector 211 is positioned at an inner side of the blank first current collector 111 in a thickness direction T; a separator 3 provided between the first electrode plate 1 and the second electrode plate 2 to separate the first electrode plate 1 from the second electrode plate 2; a first electrode tab 4 electrically connected to the blank first current collector 111; and a second electrode tab 5 electrically connected to the blank second current collector 211. A first end 111E of the blank first current collector 111 is beyond a second end 211E of the blank second current collector 211 in a length direction L, and a position of the first electrode tab 4 is beyond the second end 211E of the blank second current collector 211 in the length direction L; at least a part of a third winding start end E3 of the separator 3 is folded back to an inner side in the thickness direction T and is positioned between the first electrode tab 4 and the second electrode tab 5 in the length direction L.

In the wound-type cell according to the present disclosure, because a length of the blank second current collector 211 is reduced, there is no need to redundantly wind the third winding start end E3 of the separator 3 in large length as in the prior art, thereby reducing a usage amount of the separator 3 and the cost of the separator 3. In addition, because at least a part of the third winding start end E3, which is folded back to the inner side in thickness direction T, is positioned between the first electrode tab 4 and the second electrode tab 5 in the length direction L, a thickness of the third winding start end E3 of the separator 3 will not be overlapped with a thickness of the first electrode tab 4 and a thickness of the second electrode tab 5 as the cell shown in FIG. 1, thereby reducing a thickness of the wound-type cell and improve the energy density of the wound-type cell. At the same time, it is easy to realize automatic production of the wound-type cell of the present disclosure.

In an embodiment of the wound-type cell according to the present disclosure, referring to FIG. 3, the third winding start end E3 of the separator 3 is formed by two layers in the thickness direction T. The third winding start end E3 is a part of one layer and a part of the other layer which are clamped in a clamping groove G of a later mentioned winding mandrel; in the formed wound-type cell, the third winding start end E3 of the separator 3 is two layers, preferably, the two layers are attached together.

In an embodiment of the wound-type cell according to the present disclosure, the first electrode plate 1 may be a positive electrode plate or a negative electrode plate, correspondingly, the second electrode plate 2 may be a negative electrode plate or a positive electrode plate. Preferably, the first electrode plate 1 is a positive electrode plate and the second electrode plate 2 is a negative electrode plate, correspondingly, the first active material layer 12 is a positive active material layer, and specifically, the first active material layer 12 may be selected from at least one of lithium cobalt oxide ($LiCoO_2$), lithium ferric phosphate ($LiFePO_4$) and lithium manganese oxide ($LiMn_2O_4$). The second active material layer 22 is a negative active material layer, and specifically, the second active material layer 22 may be selected from at least one of carbon and silicon.

In an embodiment of the wound-type cell according to the present disclosure, the first current collector 11 is an aluminum foil, the second current collector 21 is a copper foil.

In an embodiment of the wound-type cell according to the present disclosure, the first electrode tab 4 is fixed to the blank first current collector 111 by welding.

In an embodiment of the wound-type cell according to the present disclosure, the second electrode tab 5 is fixed to the blank second current collector 211 by welding.

In an embodiment of the wound-type cell according to the present disclosure, the welding is laser welding, ultrasonic welding or resistance welding.

In an embodiment of the wound-type cell according to the present disclosure, the thickness of the first electrode tab 4 is more than a thickness of the first current collector 11. This can ensure a connection strength and an overcurrent sectional area of the first electrode tab 4.

In an embodiment of the wound-type cell according to the present disclosure, the thickness of second electrode tab 5 is more than a thickness of the second current collector 21. This can ensure a connection strength and an overcurrent sectional area of the second electrode tab 5.

In an embodiment of the wound-type cell according to the present disclosure, referring to FIG. 2 and FIG. 3, a side of the second current collector 21 which directly faces the blank first current collector 111 is not coated with the second active material layer 22. Because the blank first current collector 111 is not coated with the first active material layer 12, if the side of the second current collector 21 which directly faces the blank first current collector 111 is coated with the second active material layer 22, it is not only helpless to the capacity (lithium-ions cannot realize the reciprocating process of intercalation and deintercalation between the blank first current collector 111 and the second current collector 21 that directly faces the blank first current collector 111) but also increases the thickness of the wound-type cell and reduces the energy density of the wound-type cell. Therefore, the side of the second current collector 21 which directly faces the blank first current collector 111 may be not coated with the second active material layer 22, and this will avoid waste in material and improve the energy density of the wound-type cell.

In an embodiment of the wound-type cell according to the present disclosure, referring to FIG. 2 and FIG. 3, a side of the first current collector 11 which directly faces the blank second current collector 211 is not coated with the first active material layer 12. Because the blank second current collector 211 is not coated with the second active material layer 22, if the side of the first current collector 11 which directly faces the blank second current collector 211 is coated with the first active material layer 12, it is not only helpless to the capacity (lithium-ion cannot realize the reciprocating process of intercalation and deintercalation between the blank second current collector 211 and the first current collector 11 which directly faces the blank second current collector 211) but also increases the thickness of the wound-type cell and reduces the energy density of the wound-type cell. Therefore, the side of the first current collector 11 which directly faces the blank second current collector 211 may be not coated with the first active material layer 12, and this will avoid waste in material and improve the energy density of the wound-type cell.

In an embodiment of the wound-type cell according to the present disclosure, referring to FIG. 2 and FIG. 3, an inner side of an arc-shaped portion C of the second current collector 21 which directly faces the first end 111E of the blank first current collector 111 is not coated with the second active material layer 22. Because the first end 111E of the blank first current collector 111, which directly faces the inner side of the arc-shaped portion C of the second current collector 21, is not coated with the first active material layer 12, if the inner side of the arc-shaped portion C is coated with the second active material layer 22, it is not only helpless to the capacity (lithium-ion cannot realize the reciprocating process of intercalation and deintercalation between the inner side of the arc-shaped portion C of the second current collector 21 and the first end 111E of the blank first current collector 111) but also increases the thickness of the wound-type cell and reduces the energy density of the wound-type cell. Therefore, the inner side of the arc-shaped portion C may be not coated with the second active material layer 22, and this will avoid waste in material and improve the energy density of the wound-type cell.

Secondly, a winding mandrel according to a second aspect of the present disclosure will be described.

Referring to FIG. 2, a winding mandrel according to a second aspect of the present disclosure is used for winding the wound-type cell according to the first aspect of the present disclosure, the winding mandrel comprises a first winding mandrel S1 and a second winding mandrel S2 which are sequentially provided along the length direction L, a first end surface S11 of the first winding mandrel S1 and a second end surface S21 of the second winding mandrel S2 face each other and form a clamping groove G; an end of the first end surface S11 which is close to the blank second current collector 211 is beyond an end of the first end surface S11 which is away from the blank second current collector 211 in the length direction L; correspondingly, an end of the second end surface S21 which is close to the blank second current collector 211 is beyond an end of the second end surface S21 which is away from the blank second current collector 211 in the length direction L.

In an embodiment of the wound-type cell according to the present disclosure, referring to FIG. 2, the first end surface S11 and the second end surface S21 are parallel to each other.

In an embodiment of the wound-type cell according to the present disclosure, referring to FIG. 2, an angle between the first end surface S11 and a first side surface S12 of the first winding mandrel S1 which is close to the blank second current collector 211 is between 20 degrees and 70 degrees; correspondingly, an angle between the second end surface S21 and a second side surface S22 of the second winding mandrel S2 which is close to the blank second current collector 211 is between 160 degrees and 110 degrees.

What is claimed is:

1. A wound-type cell, comprising:
a first electrode plate;
a second electrode plate;
a separator, disposed between the first electrode plate and the second electrode plate;
a first electrode tab electrically connected to the first electrode plate; and
a second electrode tab electrically connected to the second electrode plate;
wherein
the first electrode tab and the second electrode tab are positioned on a same side relative to a central line of the wound-type cell, the first electrode tab is electrically connected to one surface of the first electrode plate facing away from the central line of the wound-type cell, the second electrode tab is electrically connected to one surface of the second electrode plate facing away from the central line of the wound-type cell, and the central line is perpendicular to a thickness direction of the wound-type cell; and
the separator comprises a third winding start end having a U-shaped portion, the U-shaped portion of the third winding start end is folded back to an inner side towards the central line of the wound-type cell in a slant angle relative to the thickness direction and is disposed between the first electrode tab and the second electrode tab in a length direction of the wound-type cell.

2. The wound-type cell according to claim 1, wherein the first electrode plate comprises a first current collector and a first active material layer coated on a surface of the first current collector, the first electrode plate further comprises a blank first current collector positioned at a first winding start end and is not coated with the first active material layer;
the second electrode plate comprises a second current collector and a second active material layer coated on a surface of the second current collector, the second electrode plate further comprises a blank second current collector positioned at a second winding start end and is not coated with the second active material layer, and the blank second current collector is positioned at an inner side of the blank first current collector in the thickness direction of the wound-type cell;
the first electrode tab is electrically connected to the blank first current collector; and the second electrode tab is electrically connected to the blank second current collector; a first end of the blank first current collector is beyond a second end of the blank second current collector in the length direction, and the first electrode tab is beyond the second end of the blank second current collector in the length direction,
wherein the blank first current collector of the first electrode plate and the blank second current collector of the second electrode plate are each in physical contact with a respective one of two opposites sides of the separator in the thickness direction of the wound-type cell.

3. The wound-type cell according to claim 2, wherein a side of the second current collector directly facing the blank first current collector is not coated with the second active material layer.

4. The wound-type cell according to claim 2, wherein a side of the first current collector directly facing the blank second current collector is not coated with the first active material layer.

5. The wound-type cell according to claim 2, wherein an inner side of an arc-shaped portion of the second current collector directly facing the first end of the blank first current collector is not coated with the second active material layer.

6. The wound-type cell according to claim 2, wherein the first winding start end of the first electrode plate and the second winding start end of the second electrode plate face along a same direction in the length direction.

7. The wound-type cell according to claim 1, wherein the third winding start end comprises no more than two layers of the separator in the thickness direction.

8. The wound-type cell according to claim 1, wherein the first electrode plate is a positive electrode plate and the second electrode plate is a negative electrode plate.

9. The wound-type cell according to claim 1, wherein
a thickness of the first electrode tab is greater than a thickness of the first current collector;
a thickness of second electrode tab is greater than a thickness of the second current collector.

10. A wound-type cell, comprising:
a first electrode plate;
a second electrode plate;
a separator, disposed between the first electrode plate and the second electrode plate;
a first electrode tab electrically connected to the first electrode plate; and
a second electrode tab electrically connected to the second electrode plate;
wherein
the first electrode tab and the second electrode tab are positioned on a same side relative to a central line of the wound-type cell, and the central line is perpendicular to a thickness direction of the wound-type cell; and
the separator comprises a third winding start end having a U-shaped portion, the U-shaped portion of the third winding start end is folded back to an inner side towards the central line of the wound-type cell in the thickness direction and is disposed between the first electrode tab and the second electrode tab in a length direction of the wound-type cell and the U-shaped portion of the third winding start end has a tilted acute angle between 20 degrees and 70 degrees relative to an inner end of the second electrode plate near the central line of the wound-type cell.

11. The wound-type cell according to claim 10, wherein the first electrode plate comprises a first current collector and a first active material layer coated on a surface of the first current collector, the first electrode plate further comprises a blank first current collector positioned at a first winding start end and is not coated with the first active material layer;

the second electrode plate comprises a second current collector and a second active material layer coated on a surface of the second current collector, the second electrode plate further comprises a blank second current collector positioned at a second winding start end and is not coated with the second active material layer, and the blank second current collector is positioned at an inner side of the blank first current collector in the thickness direction of the wound-type cell;

the first electrode tab is electrically connected to the blank first current collector; and the second electrode tab is electrically connected to the blank second current collector; a first end of the blank first current collector is beyond a second end of the blank second current collector in the length direction, and the first electrode tab is beyond the second end of the blank second current collector in the length direction, wherein the blank first current collector of the first electrode plate and the blank second current collector of the second electrode plate are each in physical contact with a respective one of two opposites sides of the separator in the thickness direction of the wound-type cell.

12. The wound-type cell according to claim 11, wherein a side of the second current collector directly facing the blank first current collector is not coated with the second active material layer.

13. The wound-type cell according to claim 11, wherein a side of the first current collector directly facing the blank second current collector is not coated with the first active material layer.

14. The wound-type cell according to claim 11, wherein an inner side of an arc-shaped portion of the second current collector directly facing the first end of the blank first current collector is not coated with the second active material layer.

15. The wound-type cell according to claim 10, wherein the third winding start end comprises no more than two layers of the separator in the thickness direction.

16. The wound-type cell according to claim 10, wherein the first electrode plate is a positive electrode plate and the second electrode plate is a negative electrode plate.

17. The wound-type cell according to claim 10, wherein
a thickness of the first electrode tab is greater than a thickness of the first current collector;
a thickness of second electrode tab is greater than a thickness of the second current collector.

18. The wound-type cell according to claim 10, wherein the first winding start end of the first electrode plate and the second winding start end of the second electrode plate face along a same direction in the length direction.

* * * * *